No. 658,080. Patented Sept. 18, 1900.
C. COLAHAN.
BELT TIGHTENER FOR GRAIN CARRIERS.
(Application filed Feb. 28, 1900.)
(No Model.)

Witnesses
E. B. Gilchrist
M. H. Colahan

Inventor,
Chas. Colahan

THE NORRIS PETERS CO., PHOTO-LITHO., WASHINGTON, D. C.

UNITED STATES PATENT OFFICE.

CHARLES COLAHAN, OF AKRON, OHIO.

BELT-TIGHTENER FOR GRAIN-CARRIERS.

SPECIFICATION forming part of Letters Patent No. 658,080, dated September 18, 1900.

Application filed February 28, 1900. Serial No. 6,782. (No model.)

*To all whom it may concern:*

Be it known that I, CHARLES COLAHAN, a citizen of the United States, and a resident of Akron, county of Summit, and State of Ohio, have invented certain new and useful Improvements in Belt-Tighteners for Grain-Carriers, of which the following is a specification, reference being had to the accompanying drawings, forming a part hereof.

This invention relates to improvements in grain-carriers for harvesters having an endless apron or belt of canvas or other material adapted to run over rollers at each end of the platform or elevator of a harvester. These aprons are affected by atmospheric conditions, in which moisture will soften the fiber or material of which the apron is made, and as a consequence it will permit the elongation or stretching of the apron so much that it will become loose on the rollers, and unless tightened by some means the function of the roller is lost, as it will run in loose contact with the apron, and the roller must be tightened immediately or the harvester will be clogged up with the incoming grain, and also it is often the case that the grain is damp, which has a similar effect, and when the sun dries the apron it is liable to be loose on the roller and requires tightening. Thus it will be seen when the harvester is in operation it is important that convenient and effective means should be available to secure the uninterrupted carrying forward of the grain, and in order to accomplish this purpose the carrier-roller should be equally and simultaneously adjusted at each journal-bearing at the ends of the roller. These bearings are held in equilibrium by means of their connection with the adjusting-lever, as shown in my Patent No. 285,464, dated September 25, 1883, of which my present invention is an improvement, and consists in a novel organization of mechanism and the combination of parts, as shown in the drawings and hereinafter described and claimed.

In the drawings, Figure 1 is a plan view. Fig. 2 is a vertical section showing the adjusting-lever and its pawl and ratchet operating in connection with the segmental actuating-teeth and their pivotal connection with their supporting-bar between the aprons. Fig. 3 is a rear sectional view showing the adjusting-lever extended through the platform-frame and the detachable connecting spring-link that is secured parallel with the harvester-frame on which are the ratchet-teeth, with which the lever may be held when the spring-link is disconnected therefrom or against the stress of the spring if it is attached when it is desired to loosen the canvas. Figs. 4 and 5 are sectional views on lines 4 4 and 5 5 of Fig. 1.

As shown in the drawings, A A represent the teeth on the adjustable roller-supporting arms $a\ a$, secured at each side to the main frame B by the holding-brackets $b\ b$.

C is the apron-roller, and D D the apron.

$b^3$ is the apron-supporting ledge, secured to the harvester-frame along the entire length of each under side of the upper apron to prevent its sagging down when carrying the grain.

B' is the adjusting-lever-supporting bar between the apron, secured to the inner sides of the harvester-frame at each side thereof.

A' is the front toothed adjusting-segment. $A^5$ is the connecting-rod; $A^{10}$, the rear toothed segment; $A^2$, its lever-holding ratchet-teeth; $A^3$, the adjusting-lever, pivoted at $a^7$; $A^4$, the lever-locking pawl; $B^2$, the detachable spring holding link, secured to and parallel with the harvester-frame at $a^4$ and provided with an adjustable spring $a^3$, and being connected with the lever at $a^5$ will impart a constant elastic pressure to the apron-roller. $b^7$ is the open guideway at the rear of the harvester-platform for the lever; $A^7$, the locking-ratchet to hold the lever, as hereinafter stated; $A^6$, an adjustable registering nut; $a^8$, the pivot of the segment-adjusting rack A'; $b^2$, the bottom of the harvester-platform.

In operation it will be clearly seen that this mechanism secures the facility of quickly adjusting the apron-carrier roller to move it inwardly or outwardly and secure it at any desired point of adjustment, and also the means of securing it elastically to any point at which it may be placed or by detaching the spring it may be secured in a rigid position at any desired point, which is often required when the sun is hot and the grain is dry and heavy, and at times the harvester-carrier-apron-roller journal-bearings may become more loose and worn in one journal than the other, and it may be desirable to advance or withdraw one end of the roller, so that both ends of the roller may be lined up or registered equidistant with the corresponding fixed roller at the other end of the apron. This is done by loosening the adjusting-nut and moving the segment in its tooth connection with the rack, the segment that is moved being lifted from its pivot, and when replaced in its new relation to the rack-teeth, the other segment remaining unchanged, the adjusting-nut is caused to lengthen or shorten the connecting-rod $A^5$, as may be required to maintain the segments in their new relation to each other and the rack-teeth.

Having thus described my invention, what I claim, and desire to secure by Letters Patent, is—

1. The combination of the carrier-roller C, the adjusting supporting-racks $a\ a$, the segment-gear $A'$, the connecting-rod $A^5$ and segmental gear $A^{10}$, the adjusting-lever $A^3$, its pawl $A^4$, and the ratchet-holding teeth $A^2$ pivoted at $a^7$ substantially as shown and described.

2. The combination of the adjusting roller-supporting racks $a\ a$, the segment-gear $A'$, $A^{10}$, connecting-rod $A^5$, the pawl operating in connection with the ratchet-holding teeth $A^2$ of the segment-gear $A^{10}$, the lever $A^3$ and the spring link connection $B^2$ operating substantially as shown and described.

3. The combination of the adjusting roller-supporting racks $a, a$, the segmental gears $A'$, $A^{10}$, connecting-rod $A^5$, the ratchet-holding teeth $A^2$ secured on the rear segment $A^{10}$, with the lever $A^3$, its pawl $A^4$ and the lever-holding teeth $A^7$ on the rear of main platform-frame B, substantially as shown and described.

4. The combination of the gear-racks $a$ and the carrier-roll C with the adjusting-segments $A'\ A^{10}$ and the connecting-rod $A^5$ and adjusting-nut $A^6$ as a means of retaining the segment in any position of independent adjustment with the toothed rack as and for the purposes described.

5. The combination of the roller-supporting adjustable arms $a\ a$, the segment $A'$, connecting-rod $A^5$, segment $A^{10}$, and adjusting-lever $A^3$ operating substantially as shown and described.

6. The roller-supporting adjustable arms $a\ a$, the segment $A'$, connecting-rod $A^5$, segment $A^{10}$, and adjusting-lever $A^3$ in combination with the spring link connection $B^2$ substantially as shown and described.

CHAS. COLAHAN.

Witnesses:
M. H. COLAHAN,
A. V. WAGONER.